(12) United States Patent
Chevillard et al.

(10) Patent No.: US 12,243,666 B2
(45) Date of Patent: Mar. 4, 2025

(54) CABLE, IN PARTICULAR FOR DOWNHOLE USE, AND METHOD OF MANUFACTURING SUCH CABLE

(71) Applicant: Schlumberger Technology Corporation, Sugar Land, TX (US)

(72) Inventors: Francois Chevillard, Abbeville (FR); Pierre-Yves Corre, Abbeville (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 475 days.

(21) Appl. No.: 17/754,162

(22) PCT Filed: Sep. 28, 2020

(86) PCT No.: PCT/EP2020/077139
§ 371 (c)(1),
(2) Date: Mar. 25, 2022

(87) PCT Pub. No.: WO2021/058829
PCT Pub. Date: Apr. 1, 2021

(65) Prior Publication Data
US 2022/0293298 A1 Sep. 15, 2022

(30) Foreign Application Priority Data
Sep. 26, 2019 (EP) .................................... 19306209

(51) Int. Cl.
*H01B 7/18* (2006.01)
*E21B 17/00* (2006.01)
(Continued)

(52) U.S. Cl.
CPC ........... *H01B 7/183* (2013.01); *E21B 17/003* (2013.01); *E21B 19/008* (2013.01);
(Continued)

(58) Field of Classification Search
CPC ...... H01B 7/183; H01B 7/046; H01B 13/228; H01B 7/18; H01B 7/04; H01B 7/00;
(Continued)

(56) References Cited

U.S. PATENT DOCUMENTS 4,059,951 A    11/1977   Roe
4,929,047 A *   5/1990   Dubots ................ G02B 6/4432
                                                               385/107
(Continued)

FOREIGN PATENT DOCUMENTS

CA           2573418 A1     7/2007
CA           2602537 A1     3/2008
(Continued)

OTHER PUBLICATIONS

2nd Exam Report issued in Saudi Arabia Patent Application No. 522431803 dated Oct. 17, 2023, 14 pages.
(Continued)

*Primary Examiner* — Angel R Estrada
(74) *Attorney, Agent, or Firm* — Jeffrey D. Frantz

(57) ABSTRACT

The disclosure relates to a cable (100) comprising a core (102) and a plurality of reinforcing elements (107) arranged around the core (102) so as to cover the core (102), wherein each reinforcing element (107) includes at least a bundle of reinforcement fibers comprising at least one fiber and a thermoset matrix impregnating the bundle of fibers, wherein each reinforcing element (107) is individually tubed with a thermoplastic coating (112).

16 Claims, 7 Drawing Sheets

(51) Int. Cl.
*E21B 19/00* (2006.01)
*G02B 6/44* (2006.01)
*H01B 7/04* (2006.01)
*H01B 13/22* (2006.01)

(52) U.S. Cl.
CPC ......... *G02B 6/4432* (2013.01); *G02B 6/4486* (2013.01); *H01B 7/046* (2013.01); *H01B 13/228* (2013.01)

(58) Field of Classification Search
CPC .......... H01B 7/0009; H01B 5/00; H01B 5/08; E21B 17/003; E21B 19/008; E21B 17/00; G02B 6/4432; G02B 6/4486
USPC .......... 174/98, 70 R, 108, 107, 99 R, 120 R, 174/128.1, 106 R, 126.1
See application file for complete search history.

(56) References Cited

U.S. PATENT DOCUMENTS

| | | | | |
|---|---|---|---|---|
| 5,013,126 | A * | 5/1991 | Hattori | H01B 7/282 385/103 |
| 5,126,167 | A * | 6/1992 | Matsuno | G02B 6/443 385/107 |
| 5,650,224 | A * | 7/1997 | March | B29C 48/34 428/323 |
| 6,253,012 | B1 * | 6/2001 | Keller | G02B 6/4436 385/103 |
| 6,559,385 | B1 * | 5/2003 | Johnson | H01B 5/105 174/128.1 |
| 7,326,854 | B2 | 2/2008 | Varkey | |
| 8,225,867 | B2 | 7/2012 | Hartog et al. | |
| 8,921,692 | B2 * | 12/2014 | Nelson | H01B 7/14 174/128.1 |
| 9,145,627 | B2 * | 9/2015 | Wilson | B29C 70/025 |
| 9,460,830 | B2 * | 10/2016 | Mekala | H01B 5/105 |
| 2011/0174519 | A1 | 7/2011 | Shah | |
| 2011/0240312 | A1 | 10/2011 | Varkey | |
| 2014/0318858 | A1 | 10/2014 | Pourladian | |
| 2015/0026732 | A1 | 1/2015 | Park | |
| 2015/0354292 | A1 | 12/2015 | Frazer | |

FOREIGN PATENT DOCUMENTS

| | | |
|---|---|---|
| DE | 10016536 | 10/2001 |
| JP | 0351384 A | 3/1991 |
| JP | 0445914 A | 2/1992 |
| WO | 9959166 A2 | 11/1999 |

OTHER PUBLICATIONS

EP Search Report received on Apr. 6, 2020 for the equivalent EP 3798703 (12 pages).
Search Report and Written Opinion issued Dec. 10, 2020 of International Patent Application No. PCT/EP2020/077139 (26 pages).
International Preliminary Report on Patentability of International Patent Application No. PCT/EP2020/077139 dated Apr. 7, 2022, 8 pages.
Anonymous Peek Vs PEK Vs PTFE Greene Tweed Mar. 25, 2019 Mar. 25, 2019 XP055679495 Retrieved from the Internet URLhttpswwwgtweedcommaterialsthermoplasticsandcompositespeekvspekvsptfe retrieved on 20200325 (4 pages).
Anonymous Thermoplastic Wikipedia Apr. 4, 2017 Apr. 4, 2017 XP055362242 Retrieved from the Internet URLhttpsenwikipediaorgwikiThermoplastic retrieved on Apr. 5, 2017 (7 pages).
Office Action issued in Japanese Patent Application No. 2022-515854 dated Sep. 30, 2024, 9 pages with partial English translation.
Substantive Exam issued in Saudi Arabia Patent Application No. 522431803 dated Mar. 22, 2023, 14 pages.
Communication Pursuant to Article 94(3) issued in European Patent Application No. 19306209.8 dated Mar. 1, 2023, 8 pages.
Communication Pursuant to Article 114(2) issued in European Patent Application No. 19306209.8 dated Nov. 11, 2024, 10 pages.
Exam Report issued in United Arab Emirates Patent Application No. P6000500/2022 dated Nov. 25, 2024, 8 pages.
Anonymous, "Friction—Friction Coefficients and Calculator", found in the Engineering ToolBox (2004), downloaded from [https://www.engineeringtoolbox.com/friction-coefficients-d_778.html], 15 pages.
MatWeb: "Overview of materials for High Density Polyethylene (HDPE), Ultra High Molecular Weight", downloaded from the internet: [https://www.matweb.com/search/DataSheet.aspx], 3 pages.
Communication pursuant to Article 94(3) issued in European Patent Application No. 19306209.8 dated Dec. 11, 2024, 5 pages.

* cited by examiner

CABLE, IN PARTICULAR FOR DOWNHOLE USE, AND METHOD OF MANUFACTURING SUCH CABLE

BACKGROUND

This application is a national stage entry under 35 U.S.C. 371 of International Application No. PCT/EP2020/077139, filed Sep. 28, 2020, which claims priority to and the benefit of EP Application Serial No. 19306209.8, titled "Cable for Downhole Use," filed Sep. 26, 2019, the entire disclosure of which is hereby incorporated herein by reference.

The disclosure relates to a cable, in particular for downhole use, and a method for manufacturing such cable.

For performing operations in a wellbore, downhole tools are currently lowered in the wellbore either with a slickline cable or with a wireline cable. A slickline cable comprises a single metallic wire, generally made of steel, having good mechanical properties, such a breaking strength of 300 daN to 1,500 daN, preferably from 600 to 1,000 daN, that is, in some embodiment, coated with an insulated coating. As shown on FIG. 1, wireline cable 1 is a cable comprising one or more central conductors 2 (here, one conductor) on which are arranged a plurality of layers (for instance two layers 3,4) of metallic armor wires 5, generally made of steel, helically wrapped around the one or more central conductors, generally so that each armor wire contacts the two adjacent armor wires. Such cable architecture with metallic armor wires provides strength during logging operation.

However, density of the steel is such that wireline cables and, to a lesser extent, slickline cables are heavy and require a lot of energy to deploy it and convey the tool. Further, a typical wireline cable with metallic armor wires on the outside diameter thereof has high friction with the wellbore including the casing and the like and a high amount of energy is used to overcome the friction. Moreover, it might be difficult to reach very deep wells as the metallic reinforced cable have a risk to break under their own weight.

Therefore, reducing the weight of the cable to perform more efficient downhole jobs is an objective in the oil and gas fields. The weight reduction shall not however be detrimental to the mechanical properties of the cable and to the tool operation.

SUMMARY

The disclosure relates to a cable comprising a core and a plurality of reinforcing elements arranged around the core so as to cover the core. Each reinforcing element includes at least a bundle of reinforcement fibers comprising at least one fiber and a thermoset matrix impregnating the bundle of fibers and each reinforcing element is individually tubed with a thermoplastic coating.

The disclosure also relates to a wellbore installation including a winch having a drum for winding a cable, a downhole tool configured to be lowered into a wellbore, and the cable according to any embodiment mentioned above, having a first end wound around the drum and the downhole tool being attached a second end.

The disclosure also relates to a method of manufacturing a downhole cable, that includes forming a plurality of reinforcing element, including impregnating a bundle of reinforcement fibers including one or more reinforcement fibers with a thermoset matrix, extruding a thermoplastic coating around each reinforcing element of the plurality so as to form a tube around each reinforcing element. The method also includes arranging the plurality of tubed reinforcing elements around a core so that they cover the core and curing the thermoset matrix of the tubed reinforcing element once arranged around the core.

The cable according to the disclosure has sufficient mechanical properties due to the properties of reinforcing fibers whereas it reduces the density and weight of the cable, enabling to reduce power when operating downhole tool and also enabling new and more economical choices of design for the well site installation.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figures 2A, 2B:
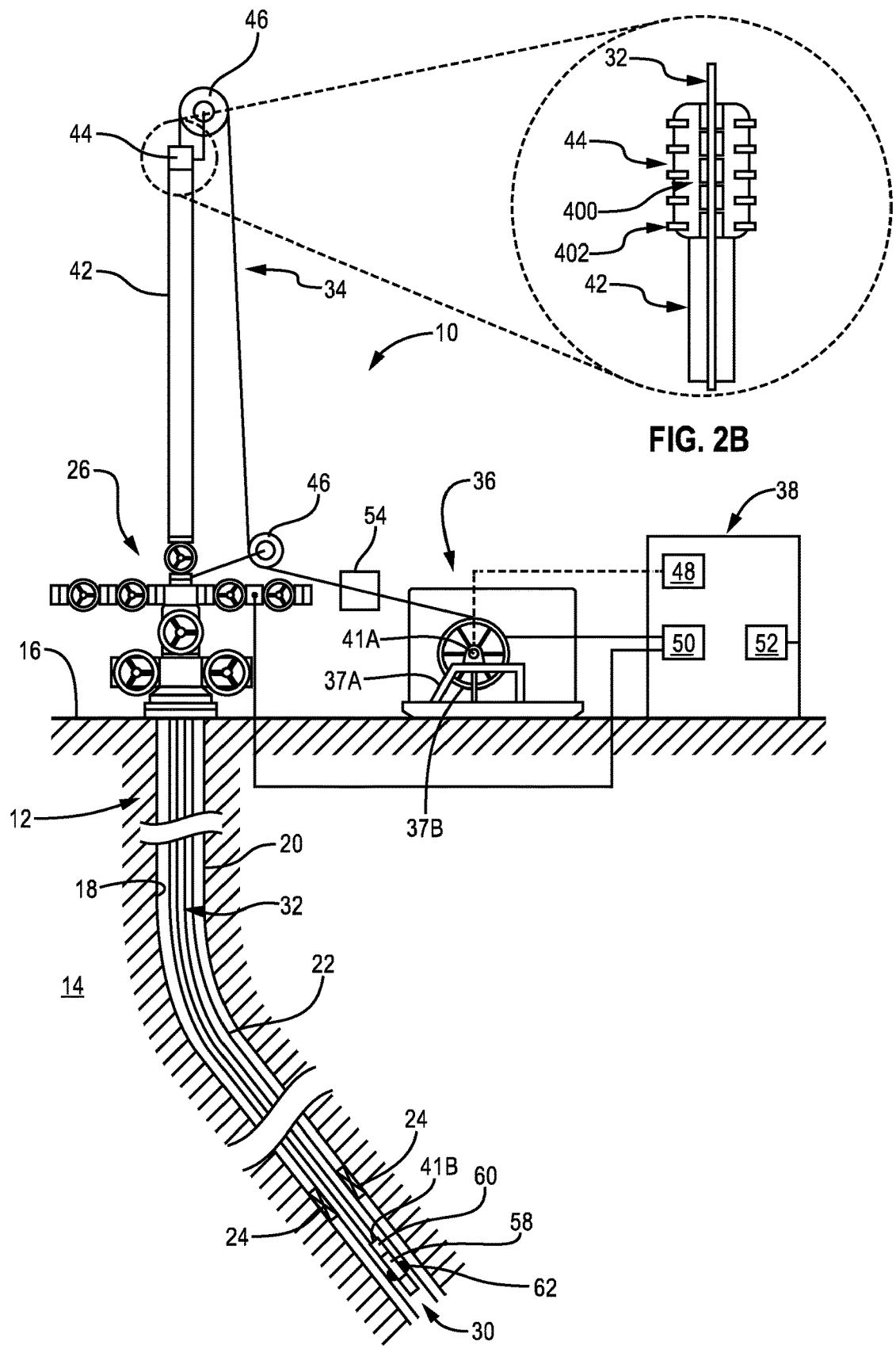
FIG. 2A is a schematic drawing of a well site installation according to an embodiment of the disclosure.
FIG. 2B is a detailed view of a portion of the well site installation of FIG. 2A.

FIG. 2A is a schematic drawing of an installation 10 including a cable for downhole use according to an embodiment of the disclosure. This installation 10 is intended to perform operations in a fluid production or injection well 12 made in the subsoil 14.

These operations are applied by means of a downhole assembly 30 for carrying out actions and/or perform measurements at the bottom of the well 12, such as perforations, cuttings by means of a torch, zonal isolation operations, jarring operations or further operations for setting tools into place such as setting into place a seal gasket or anchoring of a tool. Such operations may also include formation evaluation including assessing properties of the formation via sensors of the downhole assembly. These operations are carried out in any point of the well 12, from the surface 16.

The fluid produced in the well 12 is for example a hydrocarbon such as petroleum or natural gas and/or another effluent, such as steam or water, the well is an "injector" well into which liquid or gas is injected. The production tubing may contain one or several different types of fluid.

The well 12 is made in a cavity 18 positioned between the surface 16 of the ground and the fluid layer to be exploited (not shown) located in depth in a formation of the subsoil 14.

The well 12 generally includes an outer tubular duct 20, designated by the term of "casing", and formed for example by an assembly of tubes applied against the formations of the subsoil 14. The well 12 may also include at least one inner tubular duct 22 with a smaller diameter mounted in the outer tubular duct 20. In certain cases, the well 12 is without any duct 20, 22.

The inner tubular duct 22 is generally designated as "production tubing". It is formed with a metal assembly of metal tubes. It is wedged inside the outer tubular duct 20 for example by linings 24.

The well 12 includes a well head stuff at the surface which selectively closes the outer tubular duct 20 and said or each inner tubular duct 22. The well head 26 includes a plurality of selective access valves inside the outer tubular duct 20 and inside the inner tubular duct 22.

The installation 10 includes an intervention and measurement downhole assembly 30 intended to be lowered into the well 12 through the inner tubular duct 22, and a conveying cable 32 for deploying the downhole assembly 30 in the well 12.

The intervention installation 10 further includes a sealing and alignment assembly 34 of the cable 32, mounted on the well head 26, an assembly 36 for deploying the cable 32, positioned in the vicinity of the well head 26, and a surface control unit 38.

The sealing and alignment assembly 34 may comprise an airlock 42 mounted on the well head 26, allowing introduction of the downhole assembly 30 into the well 12. It also comprises a stuffing box 44 for achieving the seal around the cable 32 and return pulleys 46 respectively attached on the stuffing box 44 and on the well head 26 in order to send back the cable 32 towards the deployment assembly 36.

The stuffing box 44 is capable of achieving a seal around the smooth outer surface of the cable 32, for example via annular linings applied around this surface or/and by injecting a fluid between the outer surface and the wall of the stuffing box 44.

In a so-called "open well" or "open hole" alternative, in which there is no casing 20, the assembly 34 is mainly an assembly for aligning the cable, and may not comprise any sealing device.

The deployment assembly 36 includes a winch 37A provided with a drum 37B. The winch 37A and its drum 37B are laid on the ground or are optionally loaded onboard a vehicle (not shown). A spooling sleeve may be fitted around the drum 37B. The winch 37A is capable of winding or unwinding a given length of cable 32 for controlling the displacement of the downhole assembly 30 in the well 12 when moving up or down respectively. An upper end 41A of the cable may be attached onto the drum 37B.

The surface control unit 38 comprises a processor unit 48 and a first telemetry unit 50 for communicating with devices situated at the well site, for instance the winder 37B and optionally the downhole assembly 30, and a second telemetry unit 52 for communication with computers remote from the well site.

The downhole assembly 30 comprises a hollow case comprising an operating assembly 58 comprising one or several measuring module and tools 62 such as jarring tools or perforating tool or sensors. In some embodiment, the downhole assembly is capable of being controlled from the surface by electrical signals transmitted through the cable 32. In this case, the downhole assembly also comprises a telemetry module 60 for communicating with the surface control unit 38 via the cable 32 via any communication system.

The cable 32 extends between an upper end 41A, attached on the deployment assembly 36 at the surface, in particular on the drum 37B, and a lower end 41B, intended to be introduced into the well 12. The downhole assembly 30 is suspended from the lower end 41B of the cable 32.

The length of the cable 32, taken between the ends 41A, 41B may be greater than 1,000 m and is notably greater than 1,000 m and comprised between 1,000 m and 100,000 m.

In an embodiment, the cable is a slickline cable, ie a cylindrical solid cable having a smooth outer surface. In this case, the cable 32 has an outer diameter of less than 8 mm, advantageously less than 6 mm. The central core is formed by a single strand of solid metal cable, designated by the term "piano wire"

In another embodiment, the cable 32 is a wireline cable comprising one or more conductors to transmit downhole power to the downhole assembly.

Embodiments of cables that can be used as cable 32 in the installation will be described below.

Figure 3:
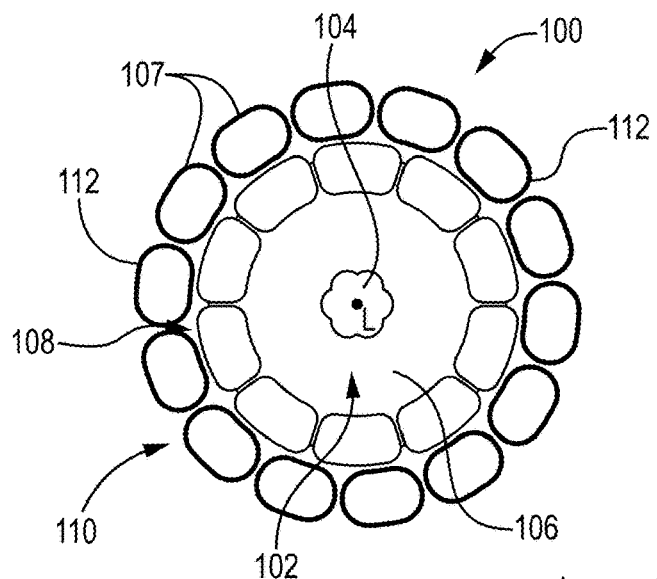
FIG. 3 is a cross section of a cable according to one embodiment of the disclosure.
Figure 4:
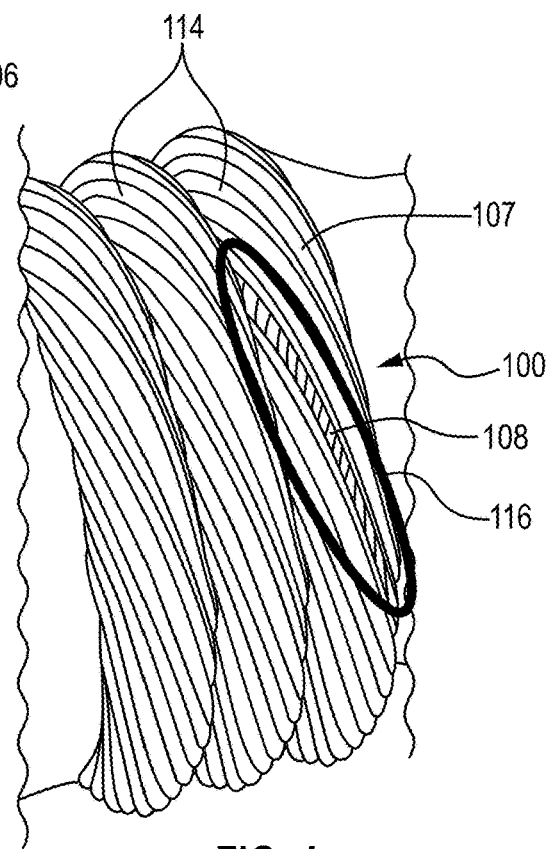
FIG. 4 is a perspective view of the cable of FIG. 3 when wound on a drum.

A cable according to a first embodiment of the disclosure is shown on FIGS. 3 and 4. As shown on the cross section of FIG. 3, the cable 100 comprises a core 102 including a conductor 104 (being at least one of an electrical conductor as described in relationship with the background section or of an optical conductor) and a polymer matrix 106 surrounding the conductor. The core has a cylindrical shape and generally extends for thousands of meters along its longitudinal axis L. The core may be a cable line, that is available off-the-shelf, a cable line assembly or a core that has been specially designed for the cable 100.

The cable 100 also includes two layers of reinforcing elements 107, a first internal layer 108 contacting the core and a second external layer 110 contacting the internal layer 108. Each reinforcing element may comprise a fiber bundle including one or more reinforcement fibers impregnated with a polymer. In other words, the reinforcement fibers of the fiber bundle may be embedded in a polymer matrix. The reinforcing fibers may be carbon, aramid, basalt or glass fibers. The polymer may contain a thermoset, such as epoxy, benzoxazine, bismaleimide or cyanate ester and/or a thermoplastic such as polyketone, including polyetherketone (PEK) or polyetheretherketone (PEEK); polyphenylene sulfide (PPS) or Polyetherimide (PEI). The composition of the reinforcing element 107 may be chosen so that it comprises between 50% and 80% of reinforcement fibers & 50 to 20% of polymer in volume. The reinforcing element 107 is generally of cylindrical shape with predetermined cross-section (rectangular, circular, etc.) and, as the core, it is several thousand meter long.

As can be seen on FIG. 3, each reinforcing element 107 is tubed by a coating 112 made of thermoplastic. The coating is applied on the external surface of the reinforcing element, on its entire periphery and length. The composition of the coating may include fluorinated polymer or elastomer, such as perfluoroalkoxy (PFA), polytetrafluoroethylene (PTFE), a polyketone, including polyetherketone (PEK) or polyetheretherketone (PEEK); polyphenylene sulfide (PPS) or Polyetherimide (PEI), ethylene tetrafluoroethylene (ETFE). As can be seen on FIG. 3, the coating forms a layer of material surrounding the prepared reinforcing element 107, at the external surface of the reinforcing element 107. This differentiates from an impregnation as mentioned above in which the whole element is filled with the impregnation material.

Such cable being a composite cable and the reinforcing element (made of fibers and polymer) having a lower density than the metallic armor wires (for instance, carbon fibers and PEEK each being about 6 times less dense than steel), it enables to significantly decrease the weight of the cable. The mechanical properties of the reinforcement fibers of the reinforcing element 107, in particular its high strength, enable to optimize the mechanical properties of the cable so that it is able to perform a downhole operation.

The reinforcing elements 107 are arranged on the cable so that each reinforcing element is able to move relative to the core and at least another reinforcing element, in particular all of the other reinforcing elements. In particular, each reinforcing element is able to move axially relative to the core and at least another reinforcing element. In this embodiment, this is achieved as there is no bond between the adjacent reinforcing elements or between each reinforcing element and the core. The fiber bundles are not embedded in a common polymer matrix immobilizing them relative to the core and the other fiber bundles placed in the common polymer matrix. In particular, in this embodiment, each reinforcing element is an independent part relative to the other reinforcing elements and devoid of connection with the adjacent reinforcing elements or core, ie is not linked to another reinforcing element through any material or mechanical bond or connection, including gluing, welding, screwing, etc.

Figure 1:
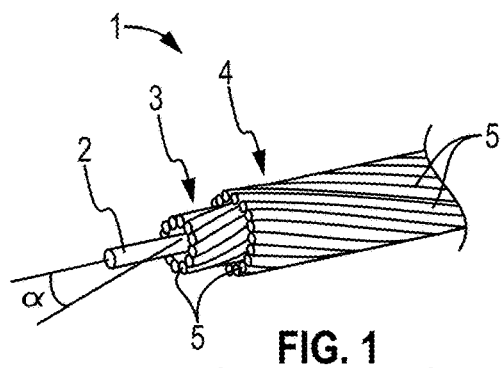
FIG. 1 is a perspective exploded view of a wireline cable according to the prior art.

The reinforcing elements 107 of the first layer 108 may be each wrapped helically around the cable with a same wrapping angle and are arranged so that each reinforcing element of the layer contacts the two adjacent reinforcing elements as well as the core, as can be seen on FIG. 4. The wrapping angle is the angle between the reinforcing element and the longitudinal axis. An example of wrapping angle α is shown on FIG. 1 for the cable of the prior art. In the embodiment of FIG. 3 &4, the angle may be set between 5° and 30°, in particular below 20°.

The thermoplastic coating 112 applied on the reinforcing element 107 is a lubricant that enables to reduce wear and friction induced by the movement between the reinforcing elements, as well as the general friction of the cable in the wellbore.

Further, the reinforcing elements being able to move relative to each other leverages the good properties of reinforcement fibers of said reinforcing element (ie high strength and low density) without creating a solid cylinder and keeping the ability of each reinforcing element to not damage when bending, which is necessary for such a cable that is stored wrapped on a drum. As it can be seen on FIG. 4 where cable is wrapped around a cylindrical element, as each of the reinforcing elements 107 has one or more degrees of freedom, in particular at least an axial degree of freedom, relative to the other reinforcing elements, the arrangement of reinforcing elements 107 may slightly be modified in order to minimize the constraints when bending the cable. For instance, it can be seen on FIG. 4 in locations 114 & 116 that the reinforcing elements move apart from each other when bent. Therefore this arrangement enables a longer life for the cable and a better conservation of its mechanical properties even when not in use and wound on the drum for a significant duration.

Besides, regarding rapid gas decompression, as the reinforcing elements are not linked together (ie not embedded in a matrix), gas can come out from the cable very quickly when pulling the cable out of hole (and passing from the high pressure of the well to the atmospheric pressure), without breaking damages to the cable. In other words, the cable is not prone to jail gas internally and therefore not subject the phenomenon of rapid gas decompression when the cable is conveyed out of hole and subjected to a significant pressure decrease.

When the cable includes more than one layer, the wrapping angle of the reinforcing elements in one layer may be different from the wrapping angle of reinforcing elements in another layer. Furthermore, the wrapping direction of the reinforcing elements may be different in each layer, as can be seen in FIG. 4 in zone 116 where the internal layer 108 is visible due to the spreading of the fibers of the external layer 110. In other words, the sign of the wrapping angle in a trigonometric space may be different for the first and second layer 108, 110. In a particular embodiment, the wrapping angle of the first layer (relative to the longitudinal axis of the cable) is opposite to the wrapping angle of the second layer.

The tubed reinforcing elements may be conformed to match a contacting surface (ie the external surface) of the core and a contacting surface of the adjacent reinforcing elements as shown on FIG. 3, in particular for the first layer of fiber 108. On FIG. 3, the reinforcing elements of the first layer takes a substantially trapezoidal shape in this configuration. Such conformation may be performed applying a compression on the cable as will be explained in more details in relationship with a manufacturing method of the fiber.

Figure 5:
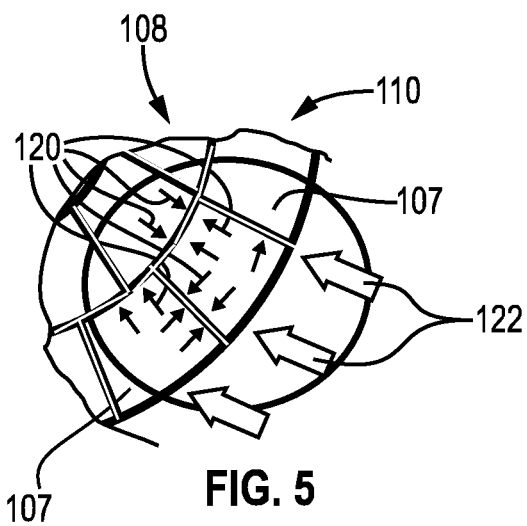
FIG. 5 is a schematic view of a detail of the cable of FIG. 3.

Such conformation enables to perform more easily the sealing of the cable when in the wellbore. Indeed, as explained in relationship with FIG. 2, when the cable is lowered in the wellbore, the cable passes in a stuffing box 44 that provides a pressure barrier between the well (high pressure) and the surface (low pressure). The stuffing box is shown in more details in FIG. 2B. It comprises packers (or packing) 400 that apply a high pressure on the whole periphery of the cable as shown by the arrows 402. Therefore, the packers 400 compress the reinforcing elements 107 against the core so that the reinforcing elements press against the core and/or each other. This is shown in particular in FIG. 5, showing schematically the efforts 120 that each tubed reinforcing element 107 (represented by a trapeze) applies on the adjacent elements when subject to a compression 122 on its entire periphery. Such compression is maintained in the wellbore due to the high pressure of the wellbore. In view of the trapezoidal shape of the reinforcing elements, the entire periphery of the reinforcing elements of the first layer is contacting with the adjacent elements (core and adjacent reinforcing elements) ensuring a barrier between the core and the well fluids, providing sealing even though the reinforcing elements are not embedded in a polymer matrix.

Further, such cable does not necessitate any grease injection to obtain leak tightness at the well head as the ability of the reinforcing elements to move relative to each other and the ability of the tubing around each reinforcing element to deform enables the cable to adapt to the shape of the packers (or packing) upon compression.

In an alternative embodiment, the coatings 112 of at least two adjacent reinforcing elements 107 may be bonded to each other, for instance by plastic welding. In particular, the thermoplastic coating of a first tubed reinforcing element is bonded with the thermoplastic coating of a second tubed reinforcing element, generally adjacent to the first tubed reinforcing element, at least locally. In this case the reinforcing elements are still considered as able to move relative to each other as the reinforcing element 107 may be configured to move relative to the coating 112, in particular slide in the tubing. The coating may in particular comprise a fluorinated polymer or elastomer that does not adhere strongly to the reinforcing element.

Such relative movement of the reinforcing elements is enabled by the structure of the cable that forms a non-uniform matrix, ie having non-uniform properties, in particular shear modulus, with a higher shear modulus for the reinforcing elements 107 and the core and a lower shear modulus for the bonded coatings 112. Therefore, the bonded coatings are capable of damping the axial constraints, enabling relative axial movement between the reinforcing elements 107 without breaking. The materials of the reinforcing elements 107 and of the coating 112 may be chosen so that ratio of the shear modulus of the coating to the shear modulus of the reinforcing elements is between 0.05 and 0.5, in particular between 0.1. and 0.2. Such structure enables as well to leverage the good properties of said reinforcing element (ie high strength and low density) while enabling relative axial movement of the reinforcing elements, without breaking the cable. The relative movement between the reinforcing fibers, in particular in the axial direction are 10 to 100 times higher than when fiber bundles are embedded in an uniform matrix, in particular a uniform matrix of thermoset material. Therefore, when it is defined that the reinforcing elements are able to move relative to each other it is to be understood that the relative movement of the reinforcing elements containing the bundle of fibers without breaking is at least twice higher than if the bundle of fibers were embedded in an uniform matrix forming a rigid cylinder. In other words, this structure is a compromise between rigidity and strength that is necessary for the cable to withstand the harsh downhole conditions, and flexibility, enabling to wind and unwind the cable on a drum without damaging it.

Figure 15:
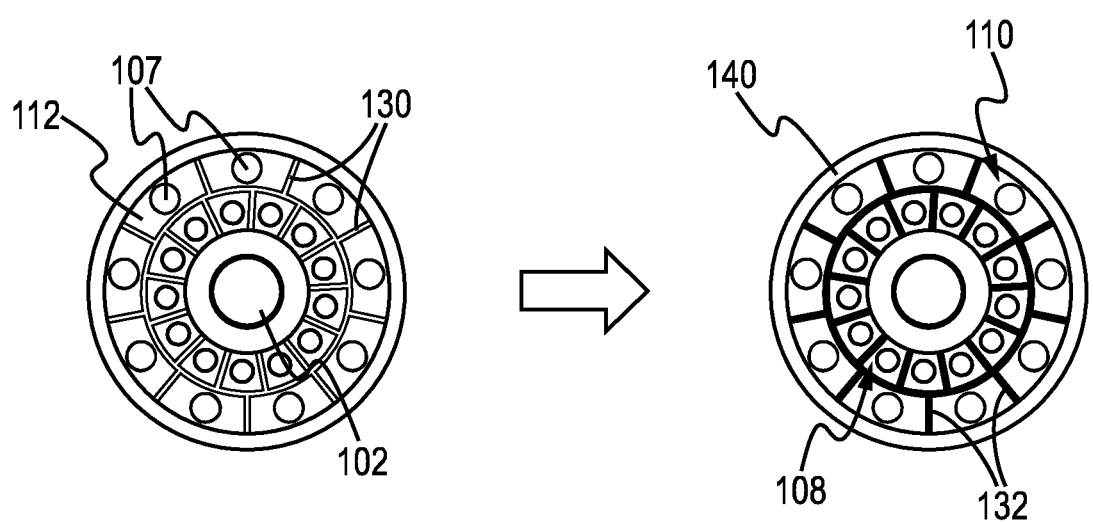
FIG. 15 is a schematic drawing of a cable according to an embodiment of the disclosure.

Such embodiment where coatings 112 tubing reinforcing elements 107 are bonded to each other is shown on FIG. 15. The cable of FIG. 15 comprises as in FIG. 3, a core 102 and a first and second layers 108, 110 of tubed reinforcing elements arranged around the core. As disclosed in relationship with the above embodiments, the reinforcing elements 107 tubed with the coating 112 are conformed to contact the matching surface of the adjacent. However, as can be seen on FIG. 15, the spaces 130 between the tubing of first and second adjacent coatings 112 is filled with material 132 in order to bond coatings 112 of adjacent reinforcing elements 107. In this embodiment, the material 132 fills all spaces but the spaces may be partially filled and the coatings 112 of adjacent fiber being locally bonded. The material 132 filling the spaces may be the material of the coating 112, in particular if the cable is heated so as to generate melting of the coatings 112 of the adjacent tubings (ie first and second coatings tubing a first and second reinforcing fiber) bonding both coatings together. In an embodiment, the material filling the spaces may be a different material than the material of the coating.

The cable of FIG. 15 also includes an outer jacket 140 that can be made of polymer, such as a thermoplastic material. The material of the outer jacket 140 may be chosen so that it has a higher melting point than the thermoplastic coating 112 of the reinforcement elements 107. Such polymer may be of the same type as the polymer of the coating but with higher melting point, for instance at least 10° C. higher. For instance, the coating of the reinforcing element may be made of ETFE LMT (ie Low Melting Temperature) whereas the outer jacket is made of ETFE EMT (High Melting Temperature). As will be explained later in relationship with the manufacturing process, such embodiment enables to form bonding or cohesion, locally or globally on the whole circumference and along the whole length of the reinforcement element, between the coating 112 of the reinforcement elements and the outer jacket 140 and between the coatings 112 of adjacent reinforcement elements, while preventing loss of material. Such embodiment may enable to block gas more efficiently.

The disclosure also includes additional embodiments as shown on FIG. 6-10. Only the differences of these embodiments with the first embodiment are highlighted.

Figure 6:
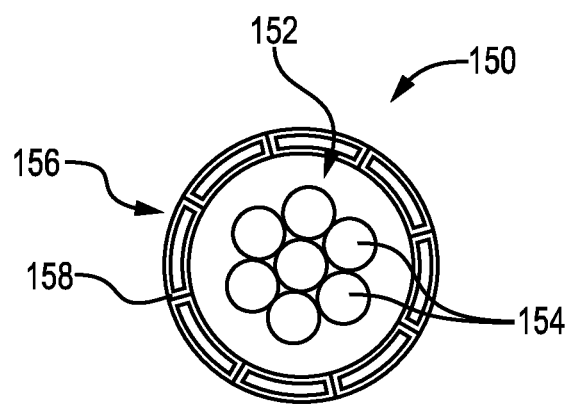
FIG. 6 is a cross section of a cable according to another embodiment of the disclosure.

As shown on the embodiment of FIG. 6, the cable 150 includes a core 152 that comprises seven conductors 154. In this embodiment, the cable is a wireline heptacable and the core is a standard core for such cable. Further, on FIG. 6, the reinforcing elements 156 are flat, having a rectangular cross section with a length at least five times longer than the width, also wrapped helically around the core and tubed with a thermoplastic coating 158. Reinforcing elements 156 with such cross section allows smaller cable radius. However, it is to be noted that other cross section of the reinforcing element (triangular, polygonal, trilobal, etc.) are also part of the current disclosure.

In the embodiment of FIG. 6, the cable comprises only one layer of reinforcing elements wrapped around the core. It is to be noted that the cable may comprise any number of reinforcing element layers and not only one or two.

In another embodiment, the reinforcing elements of at least one layer may be arranged as a fabric containing entangled tubed reinforcing elements with different orientations. In such fabric, the reinforcing elements with different wrapping orientations cross at several locations but are still able to move relative to each other, in particular axially. In an example of such fabric, the reinforcing elements 170 are braided, having reinforcing elements in two different wrapping orientations 172, 174 as shown on FIG. 7. On the example of FIG. 7 the proportion of reinforcing elements in each orientation 172, 174 is about 50%. However, any other way of entangling the reinforcing elements is considered as part of the disclosure. For instance, the fabric may comprise reinforcing elements in more than two orientations or have reinforcing elements of each orientation in different proportions. Further, when the cable comprises several layers, only one of the layers, for instance the external layer, may be made of such fabric of entangled reinforcing elements.

Figure 8:
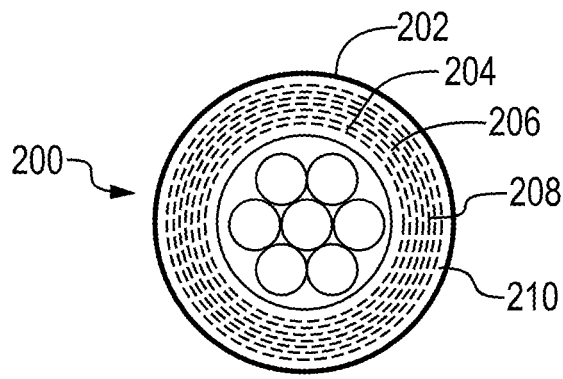

In another embodiment shown on FIG. 8, a cable 200 includes an outer jacket 202. The outer jacket may be a thermoplastic jacket, for instance made of fluorinated polymer or elastomer, such as perfluoroalkoxy (PFA), polytetrafluoroethylene (PTFE), and/or a polyketone, including polyetherketone (PEK) or polyetheretherketone (PEEK); and/or polyphenylene sulfide (PPS) and/or Polyetherimide (PEI). The outer jacket 202 may be a thin metallic tube, for instance crimped over the cable or a metallic braid. The jacket enables to add protection from well fluid to the cable and is able to further decrease the friction and to hold the reinforcing elements together in particular in case of damages to the cable. In an embodiment, the jacket 202 may be porous, in order to avoid jailing the gas in the cable, as explained in relationship with the rapid gas decompression phenomenon. In the embodiment of FIG. 8, the cable comprises four layers 204-210 of flat reinforcing elements represented schematically but the outer jacket may be disposed on a cable having any configuration of reinforcing elements and any number of layers.

Figure 9:
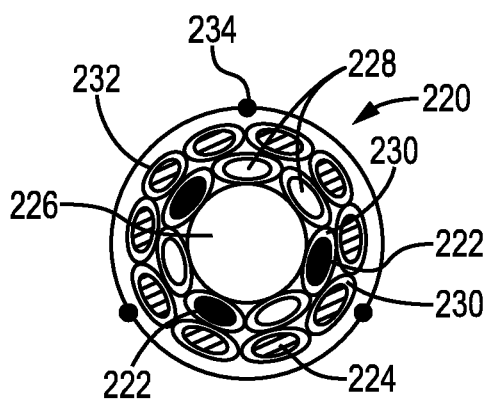
FIG. 8-10 are cross sections of cables according to other embodiments of the disclosure.

In an additional embodiment shown on FIG. 9, the cable 220 may comprise at least one or more metallic wires 222, for instance made of copper or aluminium or copper and/or alloys comprising copper and/or aluminium, and one or more optical fibers 224 wrapped around the core 226 so as each metallic wire 222 or optical fiber 224 is able to move relative to the core and as well relative to the reinforcing elements. The optical fibers and/or metallic wires 224, 222 may be wrapped around the core in a same layer as reinforcing elements 228, as it is shown here for the metallic wires 222. Alternatively, they may be set in a different layer, and also helically wrapped around the core, as shown on FIG. 6 for the optical fibers 224. In another configuration, the optical fibers and/or metallic wires 224, 222 may extend parallel to the longitudinal axis of the core. The metallic wires and/or optical fibers wrapped around the core may form one or more electrical and/or optical conductors of the cable.

Having the metallic wires or optical fibers in a different layer than the reinforcing elements enables to set the wrapping angle for each type of element independently, which may be useful if the mechanical properties of the elements are not the same for instance or if specific requirements apply to one of the element.

Further, the optical fibers and/or metallic wires are preferably tubed with a thermoplastic coating 230 like the reinforcing elements, in order to limit the friction between the different elements wrapped around the core.

In the embodiment of FIG. 9, the core does not comprise any conductor. The conductors may indeed be wrapped around the core as explained above, and, in this case, the core may have only a mechanical function. The conductors may be provided by the one or more metallic wires when these metallic wires are connected at the surface. In such case, the metallic wires may transmit power and/or communication signals from the surface to the downhole assembly or from the downhole assembly to the surface. However, the metallic wires could not be used as conductors but only as another type of reinforcements. Further, the core could comprise conductors and the metallic wires could be used as additional conductors.

In the embodiment of FIG. 9, the core may be made of material with a high Young's modulus (such as polymer associated with high Young's modulus carbon fibers or including in particular the metallic wires). Thus the cable includes material with high Young's modulus at the center and a lower Young's modulus (such as polymer associated with low Young's modulus carbon fibers) closer to the external surface so that the central portion of the cable is more flexible. Indeed, such configuration enables that the elements situated at the outer diameter of the cable (reinforcing elements or metallic wires) will be able to stretch more than the core (designed to have a high Young Modulus) during bending (ie when the cable is stored on a drum) as the outer elements are subject to more constraints when bending the cable. The core having a higher Young modulus, it has higher stiffness. Therefore for the same overall cable stiffness, such configuration increases the cable resistance to bending and cable life.

Being able to place conductors elsewhere than in the core enables a greater design flexibility for the core and to obtain such configuration. For instance, the core may comprise as well one or more of a reinforcing element (including at least a bundle of reinforcement fibers and optionally a polymer matrix) also tubed with a thermoplastic coating. The reinforcing elements may be designed (ie number and type of fibers, type and portion of polymer matrix (if any)) in order to optimize the properties of the core, in particular its Young's modulus.

The optical fibers 224 may enable to measure one or more characteristic of the cable in order to predict when maintenance of the cable is needed or one or more characteristic of the wellsite and/or the formation. In order to perform such measurement the fibers may be connected to an interrogator and a detector in order to be part of a Distributed Acoustic System (DAS) as described in for instance in the U.S. Pat. No. 8,225,867.

In the embodiment of FIG. 9, the cable also comprises an external liner 232 as disclosed in relationship with FIG. 8 and nude metallic wires 234 disposed around the liner. Such metallic wires 234 provide efficient electrical grounding of the cable and may either extend in a direction parallel to a longitudinal axis of the cable or to be wrapped around the outer jacket of the cable.

Figure 10:
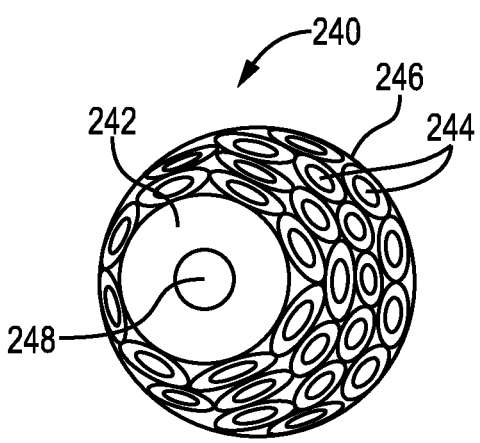
Figure 7:
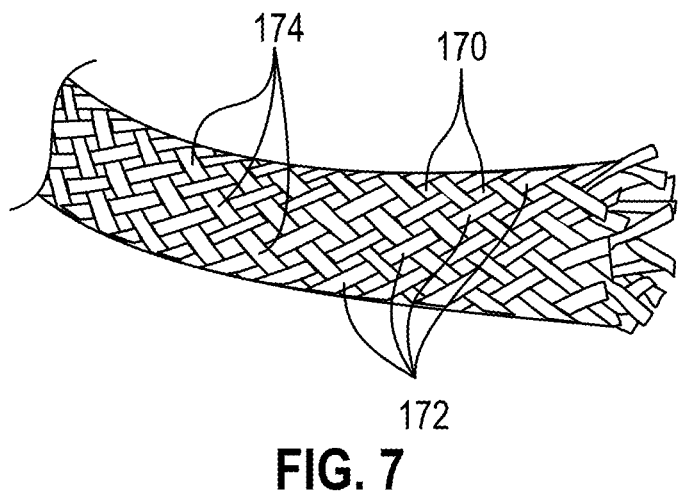
FIG. 7 is a perspective view of a portion of a cable according to another embodiment of the disclosure.

In another embodiment shown on FIG. 10, a cable 240 includes a core 242 and tubed reinforcing elements 244 all extending along the longitudinal direction of the core. A jacket 246 covers the reinforcing elements and holds them together. In this case, the reinforcing elements may be disposed so that the core is not situated at the center of the cable but closer to a side of the cable to facilitate access to the core and maintenance and repair of the conductor(s) 248 situated in the core.

Figure 11:
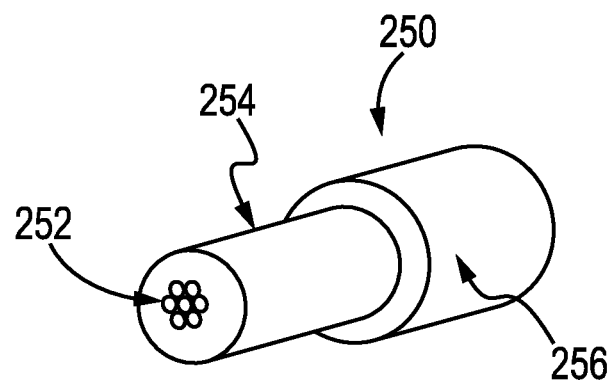
FIG. 11 is a perspective view of a portion of a cable according to an embodiment of the disclosure.

In another embodiment, metallic wires and/or optical fiber may be integrated in a reinforcing element. Such reinforcing element may be disposed around the core or may be part of the core. An example of reinforcing element 250 is shown on FIG. 11. The reinforcing element 250 includes metallic wires 252 (that can be used as conductors as explained in relationship with FIG. 9) in its center. A fiber bundle 254 is arranged around the metallic wires and a polymer matrix may impregnate the fiber bundle and the conductor. As discussed in relationship with the other embodiments, the reinforcing element is tubed by a thermoplastic coating 256. Such reinforcing element may comprise any arrangement of metallic wires and fiber bundle (for instance, the metallic wires are not disposed at the center). When the metallic wires are used as conductors, the thermoplastic coating as well as the polymer matrix being an insulating material, it can be used to insulate the conductor from the other conductors. The metallic wire(s) may be replaced by one or more optical fiber or embedded with an optical fiber in the fiber bundle. Such architecture enables to gather several functions (electrical and/or optical, as well as mechanical function) in the reinforcing element and to optimize the dimensions of the cable.

Figure 12:
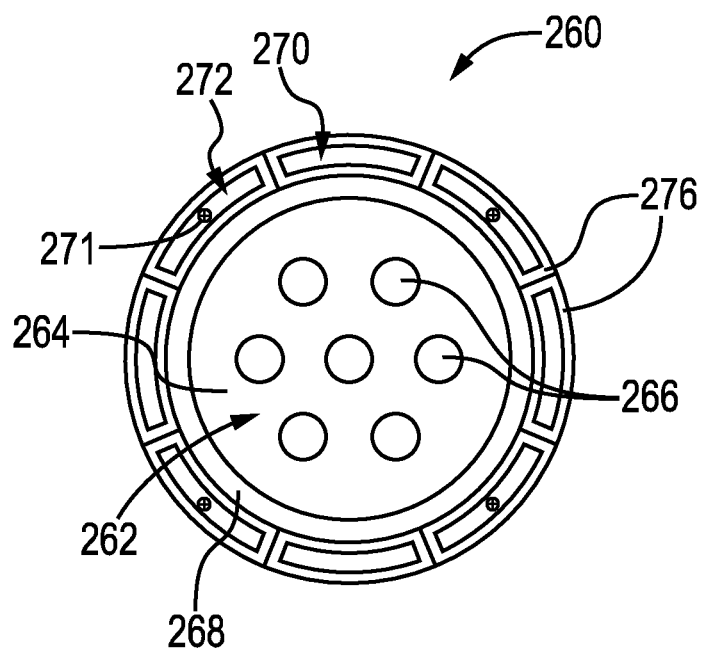
FIG. 12 is a cross-section of a cable including the portion of FIG. 11, according to an embodiment of the disclosure.

An example of cable 260 including such reinforcing element is shown on FIG. 12. Such cable 260 includes a core 262 having a reinforcing element 264 including a fiber bundle of reinforcement fibers and seven conductors 266 made of metallic wires embedded in the bundle. The conductors are made of metallic wires. The reinforcing element is tubed with a thermoplastic coating 268. The cable also comprises a first layer of reinforcing elements 270, 272 tubed with a thermoplastic coating 276 disposed around the core. The reinforcing elements 272 include a fiber optic 271 embedded in the bundle of reinforcement fibers. In this embodiment, the reinforcing element 264 is of greater dimensions than the reinforcing elements 270, 272 of the layer surrounding the core. More generally the reinforcing elements of the cable can have different dimensions and shape.

All of the cables as per the embodiments above have been described as wireline cable, in particular in which the armor wires are replaced by the fibers enabling to decrease the density of the cable and its weight. However, such a cable design could also be applicable for other downhole cable such as a slickline cable as well as cable that have application at the surface, at the well site or in other fields of application. In this case, the dimension of the single wire could be reduced compared to current cables, also enabling to decrease the cable weight.

The cable described in the disclosure might also be used for other purpose than downhole use.

In the following a method for manufacturing the cable will be disclosed as well as a method for operating the cable.

Figure 14:
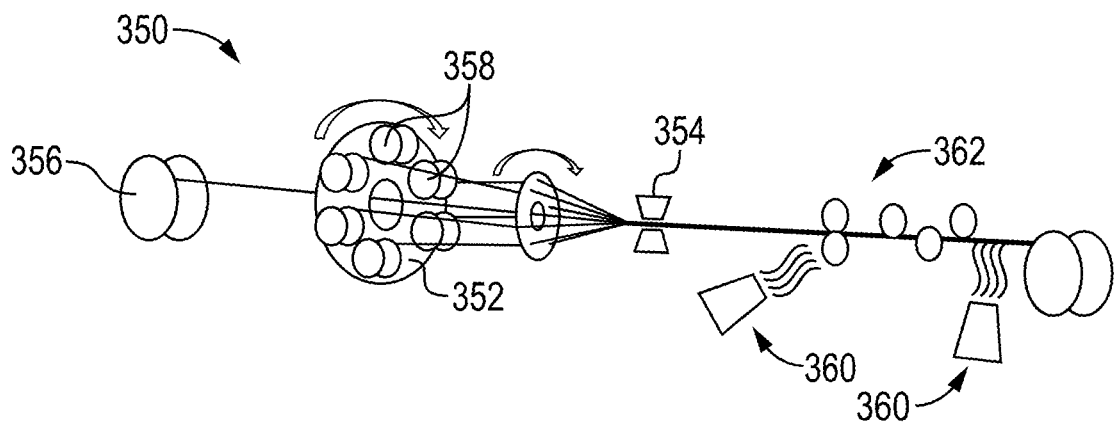
FIG. 14 is a schematic drawing of a manufacturing line of the cable according to the manufacturing method of FIG. 13.
Figure 13:
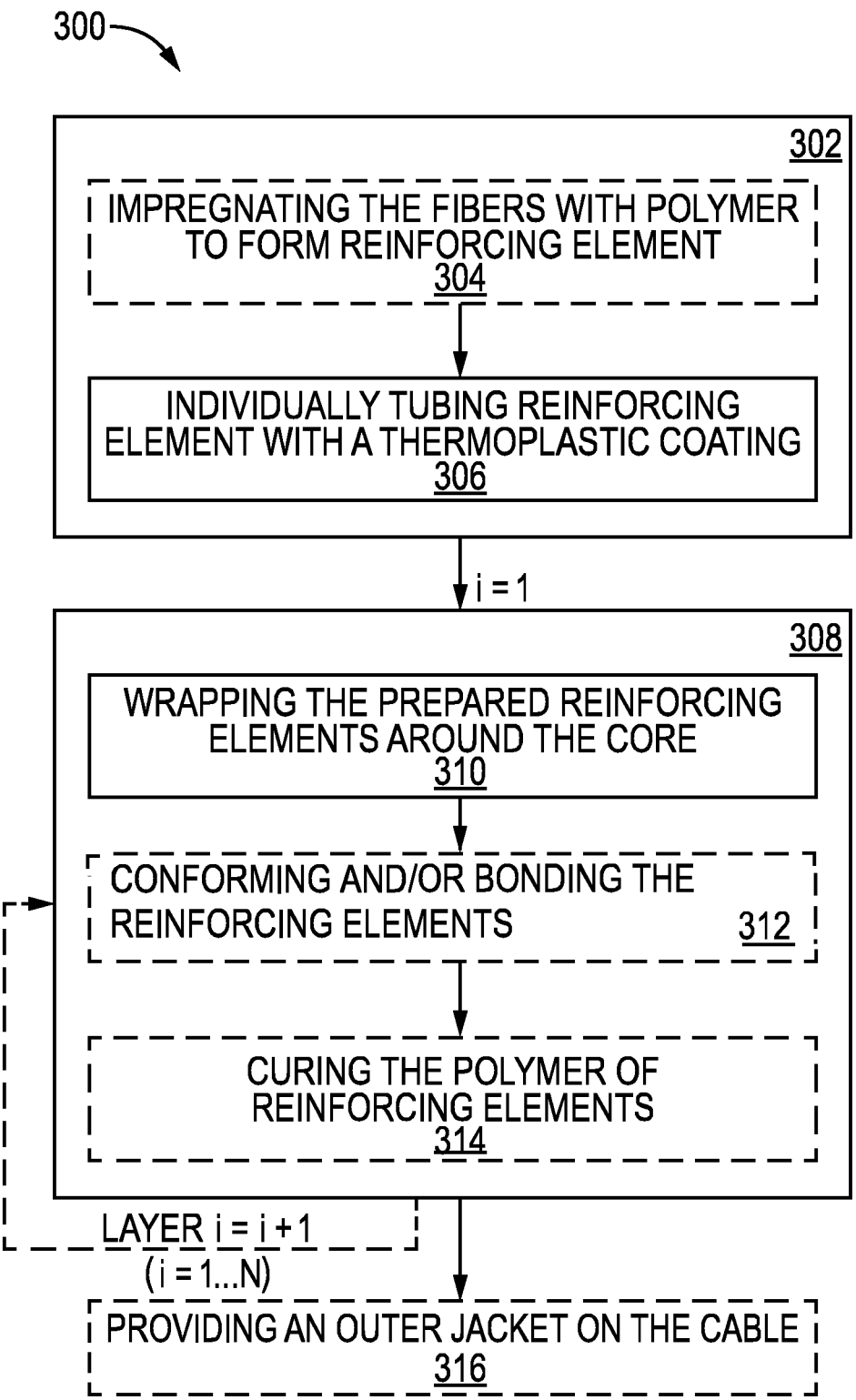
FIG. 13 is a flowchart of a manufacturing method of a cable according to an embodiment of the disclosure.

The method 300 for manufacturing the cable is described in relationship with FIGS. 13 & 14. In the flowchart of FIG. 10, the operations that are optional are represented in block with dotted line while the operations that are mandatory are represented in block with plain line. FIG. 14 shows a portion of an exemplary manufacturing line 350 of a cable according to the disclosure.

It first comprises preparing the reinforcing elements (block 302). To perform this operation, each reinforcing element is tubed individually by the thermoplastic coating, generally via an extrusion process (block 306). The fiber bundle of the reinforcing elements may also be impregnated by the polymer matrix (block 304) before they are coated by passing the fibers in a polymer bath. The reinforcing element, after operation 304, may be called a prepreg. During or before impregnation, the fiber bundle can also be conformed so that the prepreg has a predefinite section (such as cylindrical or flat). If the reinforcing element comprises a metallic wire and/or an optical fiber, the fiber bundle is arranged around the metallic wire and/or optical fiber before impregnation. Once the thermoplastic tubing has been extruded on the reinforcing elements, such prepared reinforcing elements are stored on drum. When metallic wires or optical fibers are included in the cable, they may be prepared using the same tubing operation as described in operation 306 and stored on a drum once tubed.

The manufacturing method then comprises providing a layer of reinforcing elements on the core (block 308). The core may have been prepared separately, for instance if it is constituted of several materials but may be a standard core. If the core comprises a reinforcing element, it is prepared following the same preparation operations as disclosed above.

The manufacturing method includes wrapping the tubed reinforcing elements around the core, for instance helically wrapping the reinforcing elements over the core (block 310) using a cable assembly machine, such as a planetary assembly machine 352 and a die 354 to give the cable a regular shape. In the embodiment shown on FIG. 14, each of the core and a number of reinforcing elements is unwound from a different drum 356; 358 and pass into the planetary machine 352 that enables a rotation of the reinforcing elements while the core only translates. Alternatively, the fibers might be braided as explained above.

Once the reinforcing elements are wrapped around the core, the manufacturing method may also comprise conforming the reinforcing elements to match the surface of the core and adjacent reinforcing elements by applying a compression on the cable once assembled (block 312), for instance using compressing rolls 362 and a heater 360 for facilitating deformation of the polymer matrix (if any).

In this case a high pressure is applied on the whole periphery of the cable so that the tubed reinforcing elements, that is soft, in particular because of the uncured polymer matrix of the prepreg, deform and conform to and press against the adjacent elements, ie core and fibers.

The manufacturing method may also comprise bonding at least locally a thermoplastic coating of a first tubed reinforcing element to a thermoplastic coating of a second tubed reinforcing element, for instance by increasing the temperature beyond the melting point of the thermoplastic coating so that coatings of two adjacent tubed reinforcing elements melt and bond in a melted state by plastic welding. This might be done by using heating rollers for instance. This may be performed once the tubed reinforcing elements have been conformed, or during conformation of the tubed reinforcing elements. In a variant, a filling material may be provided to bond the coating materials of the tubed reinforcing elements by plastic welding. In other words, the coatings of a first and second reinforcing elements may be bonded by plastic welding with or without interposition of filling material.

The manufacturing also comprises, when the reinforcing elements are impregnated, curing the polymer matrix of the reinforcing elements (block 314) with a heater 360 after they have been assembled on the core and optionally conformed and/or bonded. Indeed, the uncured reinforcing elements being assembled on the cable have more flexibility and may be assembled, and if needed conformed more easily than if the reinforcing elements were cured individually after impregnation. Once they are cured, the reinforcing elements have better mechanical properties than uncured. The core and the reinforcing elements may be stored on a drum.

If there are different layers of fibers on the cable, the same operation is renewed with the cable having core and wrapped fibers at the center of the cable assembly machine. When there are several layers of reinforcement elements, the optional conforming and curing operation may be performed only once after all of the layers of reinforcing elements have been assembled on the core. The manufacturing method may also comprise providing an outer jacket on the cable, for instance crimping a metallic tube or extruding a thermoplastic external layer (block 316). This operation is not represented on the manufacturing line of FIG. 11. In an alternative, the curing and/or conforming operations may be performed after the outer jacket has been provided on the cable, for all of the layers at once (if several layers).

In a particular embodiment where the outer jacket is of higher melting point than the coatings of the reinforcing elements, the manufacturing process of the cable may include:

- forming, in particular, extruding the outer jacket on the reinforcing elements. In this case, as the melting point of the outer jacket is higher than the melting point of the coating of the reinforcing elements, such extrusion also leads to a cohesion between the coating material of each reinforcement element and the outer jacket material by plastic welding, at least locally, as the coating material melts during the extrusion,
- a conformation of the cable for instance between rollers at a temperature between the melting point of the coating and the melting point of the outer jacket. During the conformation, as explained above, the reinforcing elements deform to match a contacting surface of an adjacent tubed reinforcing element and the coatings tubed around each reinforcing element also bond at least locally by plastic welding and adhere to each other while the outer jacket keeps its shape. In certain embodiment, instead or in addition to rollers, high tension may be used on cable. Such adherence from a reinforcing element to another enables to more efficiently block the gas as it at least decreases significantly the number of interstices between the reinforcing elements.

Once the cable is conformed and/or bonded, the matrix of the reinforcing element may be cured as explained above.

As explained in relationship with all the embodiments above, the cable according to the disclosure has mechanical properties adapted to a downhole use in particular with a high strength and good resistance to bending stress while enabling to significantly reduce the weight of the cable and therefore the power for operating the cable and the footprint of the well site installation. The cable may be used in other fields of technology.

The disclosure relates to a cable having at least a conductor, wherein the cable comprises a core and a plurality of reinforcing elements arranged around the core so as to cover the core. Each reinforcing element includes at least a bundle of reinforcement fibers comprising at least one fiber and a thermoset matrix impregnating the bundle of fibers, and is individually tubed with a thermoplastic coating.

The disclosure also relates to a cable comprising a core and a plurality of reinforcing elements arranged around the core so as to cover the core. Each reinforcing element includes at least a bundle of reinforcement fibers comprising at least one fiber and each reinforcing element is individually tubed with a thermoplastic coating. The cable is configured so that each reinforcing element is able to move relative to the core and to at least another reinforcing element.

The below features may apply to one or the other of the cables:

- the reinforcing elements are helically wrapped around the core. In such embodiment, the wrapping angle of the reinforcing element is less than 30°, preferable 20°, wherein the wrapping angle is the angle between a longitudinal axis of the core and the fiber,
- the core comprises at least a conductor,
- At least a conductor is wrapped around the core. In particular, the at least one of the conductors is embedded in the bundle of reinforcement fibers of at least one of the reinforcing elements,
- At least a conductor, in particular each of the conductors, is an electrical conductor, such as a metallic wire, or an optical conductor, such as a fiber optic,
- the core comprises at least a reinforcing element.
- the thermoplastic coating comprises at least one of the following material: a fluorinated polymer or elastomer, such as perfluoroalkoxy (PFA), polytetrafluoroethylene (PTFE), a polyketone, such as polyetherketone (PEK) or polyetheretherketone (PEEK); a polyphenylene sulfide (PPS) or a polyetherimide (PEI)
- each reinforcing element comprises a polymer, in particular thermoset, matrix impregnating the bundle of fibers.
- at least a reinforcement fiber may be a carbon fiber, a glass fiber, an aramid fiber or a basalt fiber.
- the cable comprises a layer including tubed reinforcing elements, each reinforcing element of the layer contacting two adjacent reinforcing elements and the core. In this embodiment, at least one tubed reinforcing element may be conformed to match a contacting surface of the core and of the adjacent reinforcing elements. For instance, at least two adjacent tubed fibers may have a trapezoidal shape
- the cable comprises a first layer comprising a first plurality of reinforcing elements wrapped around the core and a second layer comprising a second plurality of reinforcing elements wrapped around the first layer. In this embodiment, the wrapping angle of the first plurality of reinforcing elements is different from the wrapping angle from the second plurality of reinforcing elements.
- the cable comprises an outer jacket covering the plurality of reinforcing elements. The outer jacket may comprise a thermoplastic layer or a metallic tube.
- the cable may comprise a metallic wire or an optical fiber embedded in the bundle of reinforcement fibers. Alternatively, the fiber optic or conductive wire may be tubed with a thermoplastic coating. In this embodiment, the cable may comprise a first layer comprising a first plurality of reinforcing elements wrapped around the core and a second layer comprising a second plurality of reinforcing elements wrapped around the first layer, wherein the fiber optic or conductive wire is wrapped as part of the first or second layer.
- at least a reinforcing element of the plurality is a flat-shaped reinforcing element.
- a fabric of reinforcing elements having a plurality of orientations is arranged around the core.
- the cable is a wireline cable for downhole use,
- the cable is configured so that each tubed reinforcing element is able to move, in particular axially, relative to the core and to at least another reinforcing element,
- the tubed reinforcing elements are independent parts, each tubed reinforcing element being devoid of connection with other reinforcing elements,
- alternatively, the thermoplastic coating of a first tubed reinforcing elements is at least locally bonded, in particular by plastic welding, to the thermoplastic coating of a second tubed reinforcing element, with or without interposition of a filling material.
- a ratio between a shear modulus of the thermoplastic material tubing the reinforcing element to the shear modulus the thermoset material impregnating the bundle of fibers of the reinforcing element is comprised between 0.05 and 0.5, preferably between 0.1 and 0.2.

the cable comprises an outer jacket surrounding the tubed reinforcing elements. In this case, the thermoplastic coating of at least a tubed reinforcing elements may be at least locally bonded to the outer jacket. The material of the outer jacket may have a higher melting point than the material of the coating of the tubed reinforcing elements.

The disclosure also relates to a wellbore installation including a winch having a drum for winding a cable, a downhole tool configured to be lowered into a wellbore, and the cable according to any embodiment mentioned above, having a first end wound around the drum and the downhole tool being attached a second end.

The disclosure also relates to a method of manufacturing a downhole cable, that includes extruding a thermoplastic coating around each plurality reinforcing element of a plurality of reinforcing elements so as to form a tube around each reinforcing element. Each reinforcing element includes at least a bundle of reinforcement fibers including one or more reinforcement fibers. The method also includes arranging the plurality of tubed reinforcing elements around a core so that they cover the core and so that each reinforcing element is able to move relative to the core and to at least another reinforcing element.

In an embodiment, the method of manufacturing comprises impregnating the bundle of reinforcement fibers with a polymer before extruding the thermoplastic coating and curing the tubed reinforcing element after arranging the fibers around the core.

In an embodiment, arranging the reinforcing elements includes helically wrapping the reinforcing elements around the core.

The disclosure also relates to a method of manufacturing the cable including:
  a. Forming a plurality of reinforcing element, wherein forming each reinforcing element includes impregnating a bundle of reinforcement fibers including one or more reinforcement fibers with a thermoset matrix,
  b. extruding a thermoplastic coating around each reinforcing element of the plurality so as to form a tube around each reinforcing element,
  c. arranging the plurality of tubed reinforcing elements around a core so that they cover the core,
  d. curing the thermoset matrix of the tubed reinforcing element once arranged around the core.

In an embodiment, the method of manufacturing comprises conforming the reinforcing elements to match the surface of the core and adjacent reinforcing elements by applying a compression on the cable before the curing.

In an embodiment, the method of manufacturing comprises bonding at least locally a thermoplastic coating of a first tubed reinforcing element to a thermoplastic coating of a second tubed reinforcing element before the curing, preferably by heating the cable, in particular during or after the conforming. Such bonding is however performed before the curing.

In an embodiment, the method includes forming an outer jacket around the tubed reinforcing elements, wherein the outer jacket is made of a material having a higher melting than the thermoplastic coating tubing the reinforcing element, and wherein the conforming and/or bonding is performed after the outer jacket is formed. In this embodiment, the outer jacket may also be bonded at least locally to one or more of the coating of the reinforcement elements.

The invention claimed is:

1. A cable comprising:
a core; and
a layer comprising a plurality of reinforcing elements disposed around and contacting the core, wherein each reinforcing element comprises:
one or more metallic wires; and
a plurality of reinforcement fibers disposed around the one or more metallic wires, wherein the plurality of reinforcement fibers and the one or more metallic wires are impregnated with a thermoset matrix, and wherein each reinforcing element is individually tubed with a thermoplastic coating.

2. The cable of claim 1, further comprising at least one conductor, and wherein the at least one conductor is an electrical conductor or an optical conductor.

3. The cable of claim 1, wherein each reinforcing element is conformed to match a contacting surface of the core and a contacting surface of the adjacent reinforcing elements.

4. The cable of claim 3, further comprising:
a first layer comprised of the plurality of reinforcing elements; and
a second layer comprising a second plurality of reinforcing elements disposed around and contacting the first layer.

5. The cable of claim 3, wherein each reinforcing element is able to move axially relative to the core and to at least another reinforcing element.

6. The cable of claim 5, wherein the thermoplastic coating of a first reinforcing element is at least locally bonded to the thermoplastic coating of a second reinforcing element.

7. The cable of claim 6, wherein the thermoplastic coating of the first reinforcing element and the thermoplastic coating of the second reinforcing element are bonded by plastic welding.

8. The cable of claim 1, wherein a ratio of a shear modulus of the thermoplastic coating to a shear modulus of the thermoset matrix is between 0.05 and 0.5.

9. The cable of claim 1, further comprising an outer jacket surrounding the layer of the plurality of reinforcing elements.

10. The cable of claim 9, wherein the thermoplastic coating of one or more reinforcing elements of the plurality of reinforcing elements is at least locally bonded to the outer jacket.

11. The cable of claim 9, wherein the outer jacket has a higher melting point than the thermoplastic coating.

12. A wellbore installation including:
a winch having a drum for winding a cable,
a downhole tool configured to be lowered into a wellbore,
a cable comprising a first end and a second end, wherein the first end of the cable is wound around the drum and the downhole tool is attached to the second end of the cable, and wherein the cable further comprises:
a core; and
a layer comprising a plurality of reinforcing elements disposed around and contacting the core, wherein each reinforcing element comprises:
one or more metallic wires; and
a plurality of reinforcement fibers, wherein the plurality of reinforcement fibers and the one or more metallic wires are impregnated with a thermoset matrix, and wherein each reinforcing element is individually tubed with a thermoplastic coating.

13. A method of manufacturing a cable, comprising:
forming a plurality of reinforcing elements, wherein forming each reinforcing element includes arranging a plurality of reinforcement fibers around one or more metallic wires and impregnating the plurality of reinforcement fibers and the one or more metallic wires with a thermoset matrix;

extruding a thermoplastic coating around each reinforcing element of the plurality of reinforcing elements to form a tube around each reinforcing element;

arranging the plurality of reinforcing elements around a core, wherein the plurality of reinforcing elements contact the core; and curing the thermoset matrix after arranging the plurality of reinforcing elements around the core.

14. The method of manufacturing a cable according to claim 13, further comprising conforming the reinforcing elements to match a contacting surface of the core and a contacting surface of the adjacent reinforcing elements by compressing the cable before the curing the thermoset matrix.

15. The method of manufacturing a cable according to claim 14, further comprising bonding the thermoplastic coating of a first reinforcing element to the thermoplastic coating of a second reinforcing element before the curing the thermoset matrix by heating the cable.

16. The method of manufacturing a cable according to claim 15, including forming an outer jacket around the reinforcing elements, wherein the outer jacket has a higher melting point than the thermoplastic coating, and wherein at least one of the conforming or the bonding is performed after the outer jacket is formed.

\* \* \* \* \*